A. J. LEWIS.
STUD MEMBER FOR SNAP FASTENERS.
APPLICATION FILED JUNE 21, 1919.
1,320,876.
Patented Nov. 4, 1919.
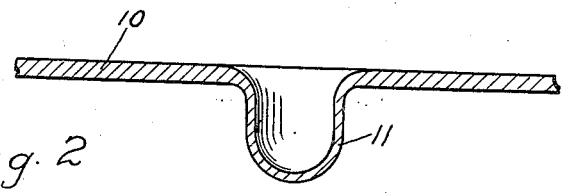
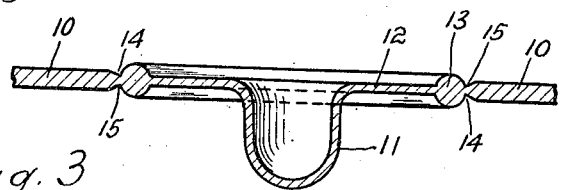
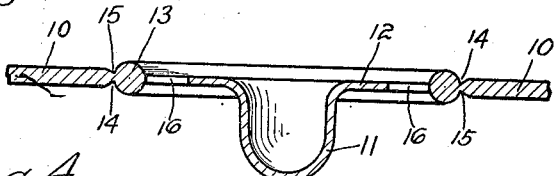
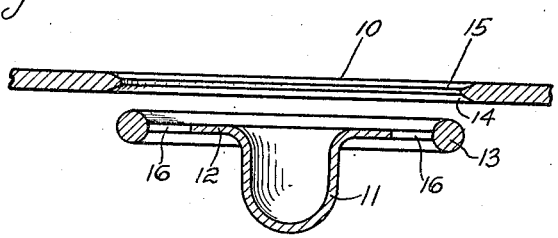
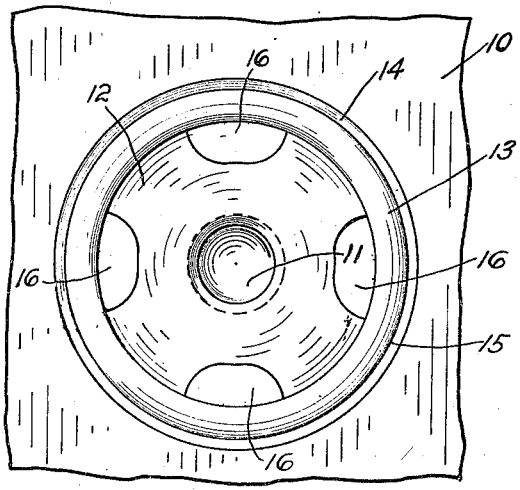
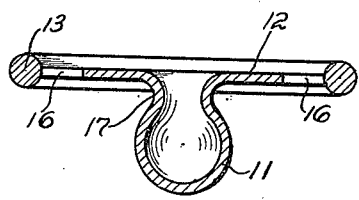
INVENTOR
Arthur J. Lewis
BY
A. M. Wooster
ATTORNEY

UNITED STATES PATENT OFFICE.

ARTHUR J. LEWIS, OF STRATFORD, CONNECTICUT, ASSIGNOR TO THE AUTOYRE COMPANY, OF OAKVILLE, CONNECTICUT, A CORPORATION OF CONNECTICUT.

STUD MEMBER FOR SNAP-FASTENERS.

1,320,876.     Specification of Letters Patent.     Patented Nov. 4, 1919.

Application filed June 21, 1919. Serial No. 305,879.

*To all whom it may concern:*

Be it known that I, ARTHUR J. LEWIS, a citizen of the United States, residing at Stratford, county of Fairfield, State of Connecticut, have invented an Improvement in Stud Members for Snap-Fasteners, of which the following is a specification.

This invention has for its object to provide a novel stud member for snap fasteners, the essential features of which are that the attaching plate be provided with a round, solid and seamless rim formed by swaging the metal of the blank strip and with thread holes so formed that an arc of the rounded rim shall form the entire thread carrying portion of the wall of each hole, thus avoiding cutting of thread by the sharp edges of the web which has been a serious objection to stud fastener members as heretofore made.

A further object of the invention is the production of a better stud fastener member than has heretofore been known, and at a greatly decreased cost of production.

With these and other objects in view I have devised the novel stud member for snap fasteners which I will now describe referring to the accompanying drawing forming a part of this specification, and using reference characters to indicate the several parts.

Figures 1, 2, 3, 4 and 5 are sectional views on a greatly enlarged scale, illustrating my novel stud fastener member and successive steps in the manufacture thereof, and Fig. 6 is a plan view corresponding with Fig. 3.

10 denotes the strip or sheet of metal from which the fastener members are blanked out and formed. The operations are all performed by punches and dies suitably designed to produce the desired result, and not illustrated as they are not of the essence of the present invention. The first operation, the effect of which is illustrated in Fig. 1, consists in forming a central stud, indicated by 11. The stud may or may not be formed in such a way as to reduce the thickness of the metal. Ordinarily, however, the metal of the stud will be somewhat thinner than the surrounding metal from which the attaching plate 12 and rim or edge 13 are formed.

The second operation is a stamping operation and the result is illustrated in Fig. 2. The metal of the strip or plate is forced outward radially from the base of the stud to form the inner half of the rim, which is rounded in cross section, and circular channels or depressions 14 are formed on opposite sides of the strip or plate by forcing the metal inward radially to form the outer half of the rounded rim which is, however, left attached to the plate by a web 15.

It will of course be understood that in all of the views the thickness of the metal is greatly enlarged.

The third operation, as illustrated in Fig. 3, is the piercing of the thread holes 16. This operation of piercing is preferably performed at this stage of the manufacture, but may be performed later as will be explained. The result of the piercing operation is clearly illustrated in Fig. 6. A vitally important feature of the thread holes is that they are of greatest length at the points of intersection of the attaching plate with the rim, so that there are no sharp edged webs left to cut the thread, as in all fastener members heretofore produced, so far as I am aware, the entire thread carrying portion of the wall of each hole being the rim itself which is solid and smoothly rounded, as is clearly shown in Figs. 4 and 5.

The fourth operation, as illustrated in Fig. 4, is the separation of the fastener member from the strip or sheet.

The fifth operation, the result of which is illustrated in Fig. 5, is the necking operation, and consists in closing in the metal at the base of the stud circumferentially to form the neck 17, which completes the formation of the member. The operation of necking may if preferred be performed before the partly formed member is detached from the strip or plate, that is, it may be performed after either the first, second or fourth operation, as shown. It is likewise not essential that the piercing operation be performed before the partly formed fastener member is detached from the strip or sheet, as it is quite practicable to perform this operation after the member, either partly or wholly formed, has been detached from the strip or sheet, as after either the fourth or fifth operation.

Having thus described my invention, I claim:

1. A fastener member comprising a stud, an attaching plate having thread holes, and a solid seamless rounded rim surrounding the attaching plate and forming the entire thread carrying portion of the wall of each hole.

2. A fastener member comprising a stud, an attaching plate, and a seamless rounded rim, surrounding the attaching plate, said plate being provided with thread holes having their greatest length at the points of intersection of the plate with the rim so that the rim will form the entire thread carrying portion of the wall of each hole.

3. A swaged stud member for snap fasteners comprising a stud, an attaching plate having thread holes, and a rounded, seamless, solid rim of greater thickness than the attaching plate.

4. A swaged stud member for snap fasteners comprising a stud, an attaching plate and a seamless, rounded rim of greater thickness than the attaching plate, the axis of the rim lying radially to the plane of the attaching plate, and the attaching plate being provided with thread holes having their greatest length between the points of intersection of the plate with the rim, an arc of the rim forming the entire thread carrying portion of the wall of each hole.

In testimony whereof I affix my signature.

ARTHUR J. LEWIS.

Copies of this patent may be obtained for five cents each, by addressing the "Commissioner of Patents, Washington, D. C."